(12) United States Patent
Kawasaki

(10) Patent No.: US 11,218,612 B2
(45) Date of Patent: Jan. 4, 2022

(54) IMAGE PROCESSING APPARATUS FOR GENERATING AN ELECTRONIC FILE OF A DOCUMENT IMAGE FROM AN OPTICALLY CAPTURED IMAGE, AND NON-TRANSITORY COMPUTER READABLE RECORDING MEDIUM THAT RECORDS IMAGE PROCESSING PROGRAM FOR GENERATING AN ELECTRONIC FILE OF A DOCUMENT IMAGE FROM AN OPTICALLY CAPTURED IMAGE

(71) Applicant: KYOCERA DOCUMENT SOLUTIONS INC., Osaka (JP)

(72) Inventor: Tomohiro Kawasaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/858,819

(22) Filed: Apr. 27, 2020

(65) Prior Publication Data

US 2020/0358915 A1 Nov. 12, 2020

(30) Foreign Application Priority Data

May 9, 2019 (JP) .............................. JP2019-089021
May 9, 2019 (JP) .............................. JP2019-089022

(51) Int. Cl.
*H04N 1/40* (2006.01)
*H04N 1/00* (2006.01)
(Continued)

(52) U.S. Cl.
CPC ..... *H04N 1/00702* (2013.01); *G06K 9/00577* (2013.01); *G06K 9/4604* (2013.01);
(Continued)

(58) Field of Classification Search
None
See application file for complete search history.

(56) References Cited

U.S. PATENT DOCUMENTS 6,427,032 B1 * 7/2002 Irons .................... G06K 9/3216
382/306
9,124,838 B2 * 9/2015 Nakao ................ H04N 1/00376
(Continued)

FOREIGN PATENT DOCUMENTS

| JP | 2011166537 A | 8/2011 |
| JP | 2015126486 A | 7/2015 |
| JP | 2018093306 A | 6/2018 |

*Primary Examiner* — Dung D Tran
(74) *Attorney, Agent, or Firm* — Li & Cai Intellectual Property (USA) Office

(57) ABSTRACT

An image processing apparatus includes a document area extracting module configured to extract a document area from the captured image, the document area being an area of the document, a note area extracting module configured to extract a first note area from the captured image, the first note area being an area of the first note positioned at a first position of the document area of the first page, a character determining module configured to determine the first character included in the first note area by optical character recognition, a document image generating module configured to mask the first note area included in the document area, and generate a document image, a file name generating module configured to generate a file name including the first character, and a file generating module configured to generate an electronic file of the document image having the file name.

7 Claims, 8 Drawing Sheets

(51) Int. Cl.
　　　*G06K 9/46*　　　(2006.01)
　　　*G06K 9/00*　　　(2006.01)
　　　*H04N 1/409*　　(2006.01)

(52) U.S. Cl.
　　　CPC ..... *H04N 1/00734* (2013.01); *H04N 1/00816* (2013.01); *H04N 1/409* (2013.01)

(56) References Cited

U.S. PATENT DOCUMENTS

| | | | |
|---|---|---|---|
| 9,560,222 B2 * | 1/2017 | Nakao | H04N 1/00336 |
| 10,666,827 B1 * | 5/2020 | Yoshidome | H04N 1/00474 |
| 10,701,232 B1 * | 6/2020 | Yoshidome | H04N 1/00968 |
| 2002/0138476 A1 * | 9/2002 | Suwa | G06F 16/93 |
| 2014/0122479 A1 * | 5/2014 | Panferov | G06F 3/0643 |
| | | | 707/736 |
| 2015/0146266 A1 * | 5/2015 | Nakao | H04N 1/00374 |
| | | | 358/452 |
| 2015/0207948 A1 * | 7/2015 | Yamaguchi | H04N 1/00374 |
| | | | 358/452 |
| 2015/0350476 A1 * | 12/2015 | Nakao | H04N 1/00336 |
| | | | 358/448 |
| 2016/0112600 A1 * | 4/2016 | Mashimo | G06K 9/00456 |
| | | | 358/3.28 |

\* cited by examiner

IMAGE PROCESSING APPARATUS FOR GENERATING AN ELECTRONIC FILE OF A DOCUMENT IMAGE FROM AN OPTICALLY CAPTURED IMAGE, AND NON-TRANSITORY COMPUTER READABLE RECORDING MEDIUM THAT RECORDS IMAGE PROCESSING PROGRAM FOR GENERATING AN ELECTRONIC FILE OF A DOCUMENT IMAGE FROM AN OPTICALLY CAPTURED IMAGE

CROSS-REFERENCE TO RELATED PATENT APPLICATION

This application claims the benefit of Japanese Priority Patent Applications JP 2019-089021 and JP 2019-089022 filed May, 9, 2019, the entire contents of which are incorporated herein by reference.

FIELD OF THE DISCLOSURE

The present disclosure relates to an image processing apparatus configured to generate an electronic file based on a captured image generated by optically capturing a document, onto which a note is attached, by an image scanner. The present disclosure relates to a non-transitory computer readable recording medium that records an image processing program.

BACKGROUND OF THE DISCLOSURE

There is known a technology of generating an electronic file based on a captured image generated by optically capturing a document, onto which a note is attached, by an image scanner.

SUMMARY OF THE DISCLOSURE

It is desirable to provide a more user-friendly technology of generating an electronic file based on a captured image generated by optically capturing a document, onto which a note is attached, by an image scanner.

According to an embodiment of the present disclosure, there is provided an image processing apparatus, including:
a controller circuit configured to operate as
a captured image obtaining module configured to obtain a captured image, the captured image being generated by optically capturing a document having one or more pages by an image scanner, a first note on which a first character is written being attached onto a first page of the document,
a document area extracting module configured to extract a document area from the captured image, the document area being an area of the document,
a note area extracting module configured to extract a first note area from the captured image, the first note area being an area of the first note positioned at a first position of the document area of the first page,
a character determining module configured to determine the first character included in the first note area by optical character recognition,
a document image generating module configured to mask the first note area included in the document area, and generate a document image,
a file name generating module configured to generate a file name including the first character, and
a file generating module configured to generate an electronic file of the document image having the file name.

According to an embodiment of the present disclosure, there is provided a non-transitory computer readable recording medium that records an image processing program that causes a controller circuit of an image processing apparatus to operate as
a captured image obtaining module configured to obtain a captured image, the captured image being generated by optically capturing a document having one or more pages by an image scanner, a first note on which a first character is written being attached onto a first page of the document,
a document area extracting module configured to extract a document area from the captured image, the document area being an area of the document,
a note area extracting module configured to extract a first note area from the captured image, the first note area being an area of the first note positioned at a first position of the document area of the first page,
a character determining module configured to determine the first character included in the first note area by optical character recognition,
a document image generating module configured to mask the first note area included in the document area, and generate a document image,
a file name generating module configured to generate a file name including the first character, and
a file generating module configured to generate an electronic file of the document image having the file name.

According to an embodiment of the present disclosure, there is provided an image processing apparatus, including:
a controller circuit configured to operate as
a captured image obtaining module configured to obtain an original captured image and a first captured image, the original captured image being generated by optically capturing a document having one or more pages by an image scanner, the first captured image being generated by optically capturing the document having the one or more pages by the image scanner, a first note on which a first character is written being attached onto a first page of the document,
a document area extracting module configured to extract a document area from the first captured image, the document area being an area of the document,
a note area extracting module configured to extract a first note area from the first captured image, the first note area being an area of the first note positioned at a first position of the document area of the first page,
a character determining module configured to determine the first character included in the first note area by optical character recognition,
a document image generating module configured to mask the first note area included in the document area, and generate a document image of the first page,
an image matching module configured to determine whether or not the document image of the first page matches with the original captured image, and thereby determine the first page of the original captured image,
a file name generating module configured to generate a file name including the first character, and
a file generating module configured to generate an electronic file of the original captured image having the file name.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, embodiments of the present disclosure will be described with reference to the drawings.

I. FIRST EMBODIMENT

An image processing apparatus of a first embodiment obtains a captured image, the captured image being generated by optically capturing a document by an image scanner, a note being attached onto the document. In the present embodiment, as a specific example of an image processing apparatus, an image forming apparatus (for example, Multifunction Peripheral, MFP) including a built-in image scanner will be described. Alternatively, an image processing apparatus may be an information processing apparatus (personal computer, tablet computer, smartphone, etc.) (not shown) without an image scanner. In this case, the information processing apparatus may obtain a captured image from an image forming apparatus including an image scanner via, typically, a network, near field communication, or USB connection.

1. Hardware Configuration of Image Forming Apparatus

Figure 1:
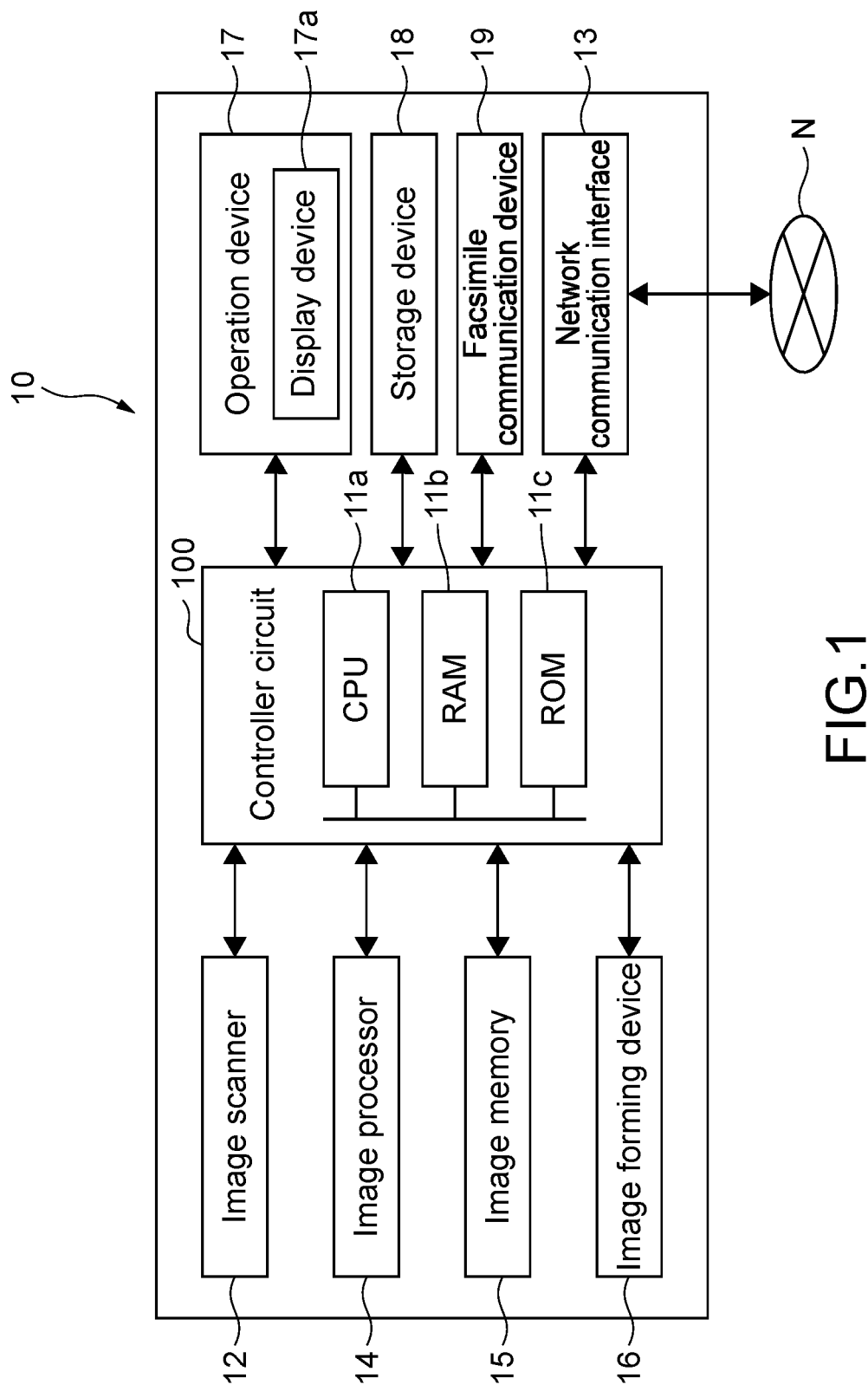
FIG. 1 shows a hardware configuration of an image forming apparatus of a first embodiment.

FIG. 1 shows a hardware configuration of an image forming apparatus of a first embodiment.

The image forming apparatus 10 includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as HDD (Hard Disk Drive) or an SSD (Solid State Drive), the facsimile communication device 19, the network communication interface 13, and the like. The operation device 17 (touch panel) is one mode of an input device. A sound input device including a microphone may be provided as an input device. The controller circuit 100 performs operational control of the respective devices connected thereto and sends/receives signals and data to/from those devices.

In the present embodiment, the image scanner 12 optically captures a document fed by an automatic feeder (not shown) or a document put on a platen (not shown), and generates an image (referred to as captured image). The document includes one or more pages of a physical medium/physical media (typically, paper). A note/notes, on which characters (typically, handwritten characters) are written, is/are attached onto at least part of the one or more pages of the document. The note is, typically, a medium (typically, paper) whose size is smaller than the size of the document. The note is entirely or partially attached (temporarily and adhesively) onto the document with pre-applied glue, sticky tape, or the like.

2. Functional Configuration of Image Forming Apparatus

Figure 2:
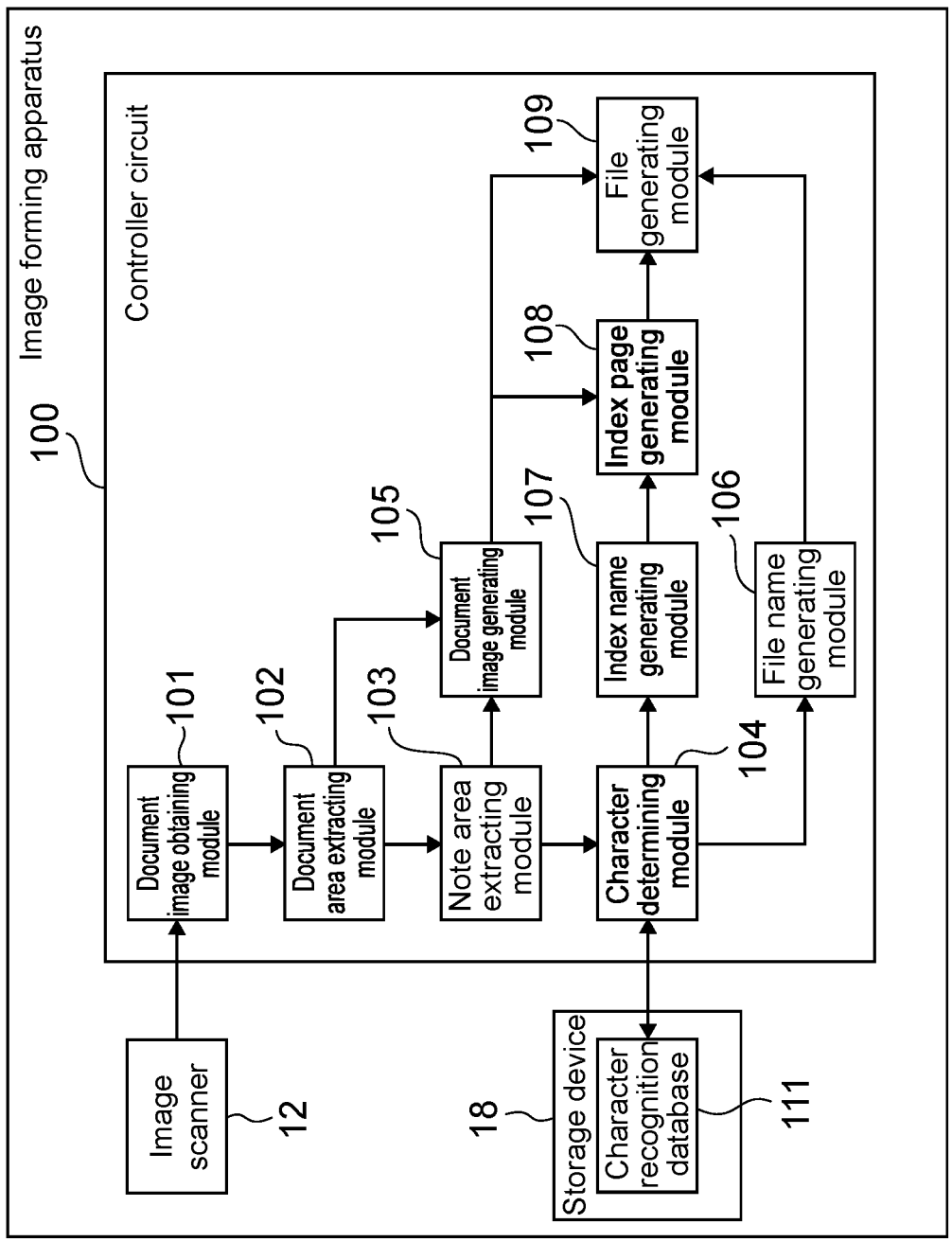
FIG. 2 shows a functional configuration of the image forming apparatus.

FIG. 2 shows a functional configuration of the image forming apparatus.

In the controller circuit 100 of the image forming apparatus 10, the CPU 11a loads an information processing program stored in the ROM 11c in the RAM 11b and executes the information processing program to operate as the document image obtaining module 101, the document area extracting module 102, the note area extracting module 103, the character determining module 104, the document image generating module 105, the file name generating module 106, the index name generating module 107, the index page generating module 108, and the file generating module 109.

3. Operational Flow of Image Forming Apparatus

Figure 3:
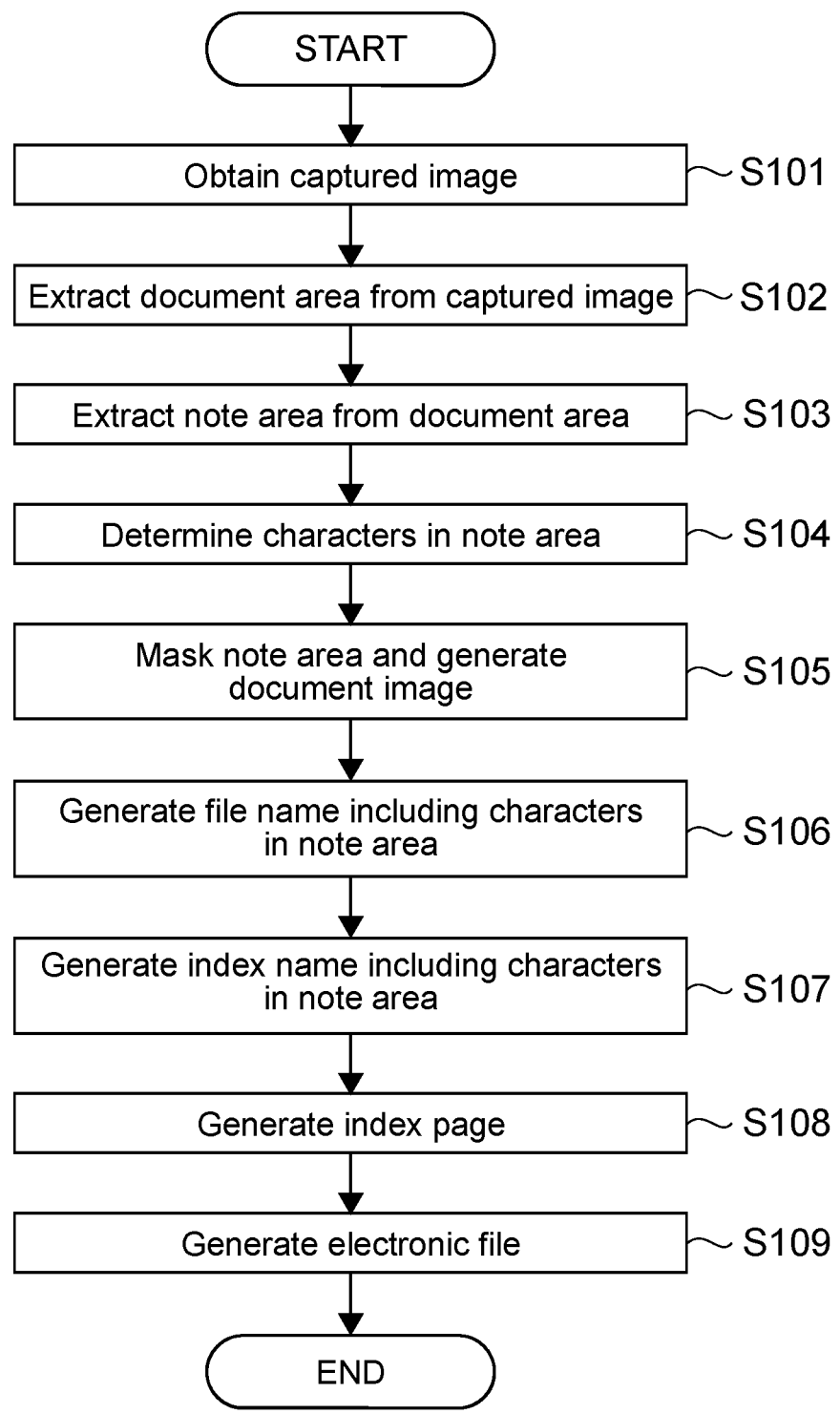
FIG. 3 shows an operational flow of the image forming apparatus.

FIG. 3 shows an operational flow of the image forming apparatus.

The document image obtaining module 101 obtains a captured image, the captured image being generated by optically capturing a document by the image scanner 12, a note being attached onto the document (Step S101). The document has one or more (in this example, multiple) pages. Notes, on which characters are written, are attached onto certain positions of at least part of (in this example, multiple) pages of the multiple pages.

Figure 4:
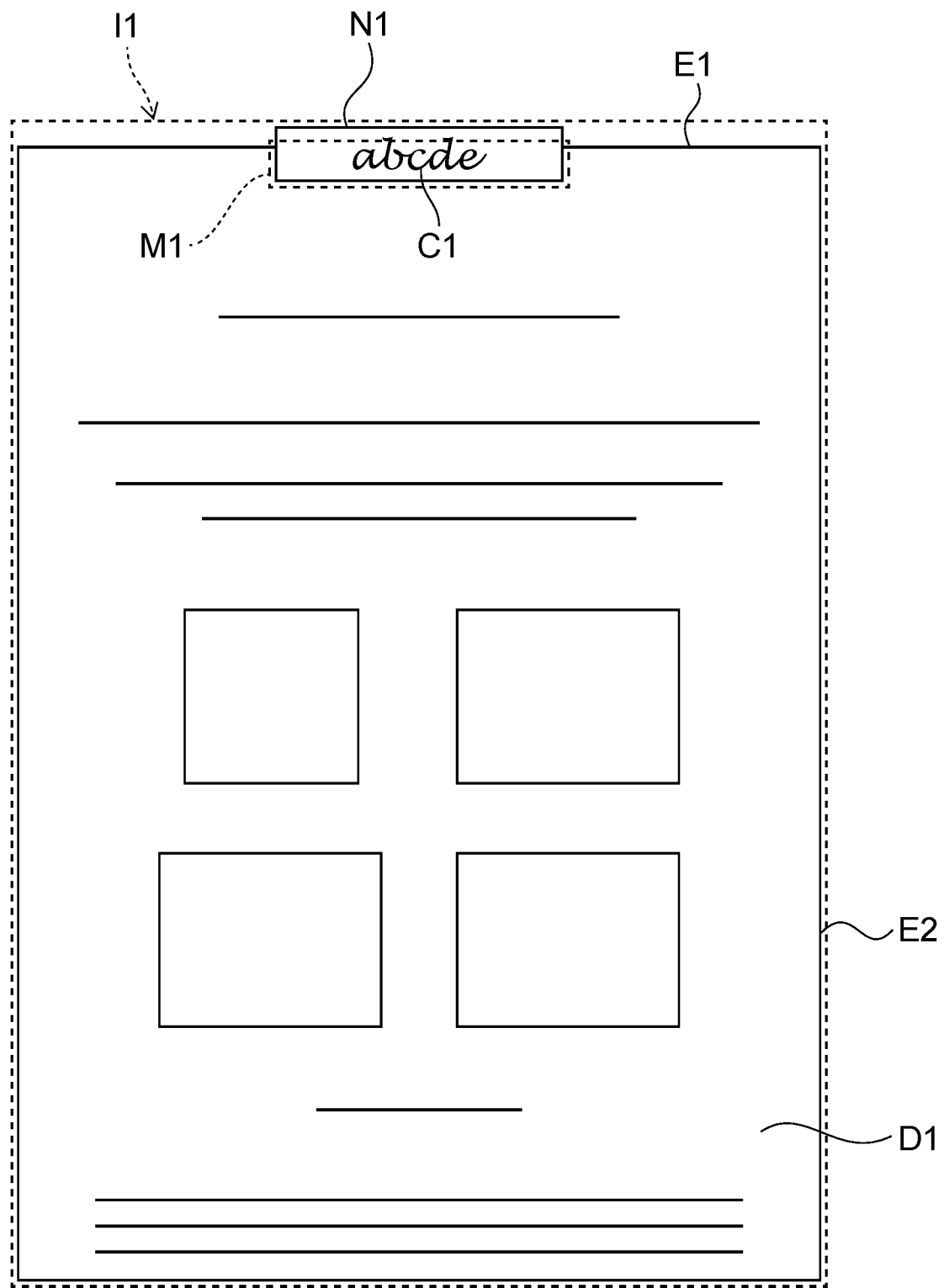
FIG. 4 shows a captured image of a page onto which a note is attached.

FIG. 4 shows a captured image of a page onto which a note is attached. FIG. shows a captured image of another page onto which a note is attached.

In this example, the document image obtaining module 101 extracts the captured image I1 or I2 of a document onto which a note is attached. The captured image I1 or I2 includes all the edges and points of the document and the edges and points of the note. In other words, the complete document and the complete note are included in the captured image I1 or I2. The captured image I1 or I2 is an image per page.

The document area extracting module 102 extracts the document area D1 or D2 from the captured image I1 or I2 by a known method (by detecting edges and/or points, etc.) (Step S102). The document area D1 or D2 is an area defined by the edges and points of a document per page out of the captured image I1 or I2. In other words, the document area D1 or D2 is a document area per page. The document area D1 or D2 includes an area on which a note is layered.

The note area extracting module 103 extracts the note area N1 or N2 positioned at a certain position (first position or second position) from the captured image I1 or I2 by a known method (by detecting edges and/or points, etc.). The note area extracting module 103 determines the position (specifically, coordinates) of the note area N1 or N2 with respect to the document area D1 or D2 (Step S103). The note area N1 or N2 is an area defined by the edges and points of a note out of the captured image I1 or I2. The note area extracting module 103 determines a rectangle having a certain size (standard size of typical note) as the note area N1 or N2. Alternatively, the note area extracting module 103 may determine a rectangle having a certain size (size of typical note commercially available) and a certain color (color of typical note commercially available) as the note area N1 or N2. The note area N1 or N2 includes the area layered on the document and the area out of the document. Note that the note area extracting module 103 fails to extract a note area not positioned at the certain position (first position or second position).

Specifically, the note area extracting module 103 extracts the first note area N1 positioned at a first position of the document area D1 from the captured image I1 of a certain page (typically, page No. 1). The distance between the first position and the first edge E1 (in this example, top edge) of the document area D1 is smaller than a first threshold. The situation in which "the distance between the first position and the first edge E1 of the document area D1 is smaller than a first threshold (first position)" means that the first note area N1 is positioned near the first edge E1 (or, as shown in the figure, is layered on the first edge E1).

Meanwhile, the note area extracting module 103 extracts the second note area N2 positioned at a second position of the document area D2 from the captured image I2 of an arbitrary page (page No. 1 or another page). The distance between the second position and the second edge E2 (in this example, right edge) of the document area D2 is smaller than a second threshold (may be same as or different from first threshold). The first edge E1 (in this example, top edge) is different from the second edge E2 (in this example, right edge). The situation in which "the distance between the second position and the second edge E2 of the document area D2 is smaller than a second threshold (second position)" means that the second note area N2 is positioned near the second edge E2 (or, as shown in the figure, is layered on the second edge E2).

The character determining module 104 determines the first characters C1 included in the first note area N1 and the second characters C2 included in the second note area N2 by OCR (Optical Character Recognition) (Step S104). Specifically, the character determining module 104 extracts the image (referred to as character image) of the first characters C1 included in the first note area N1 and the image (referred to as character image) of the second characters C2 included in the second note area N2. With reference to the character recognition database 111, the character determining module 104 determines the characters specified by the extracted character image. Specifically, the character recognition database 111 registers a character image pattern and a character code in association with each other for each character. The character determining module 104 searches the character recognition database 111 for the image pattern of the extracted character image, and determines the character code in association with the image pattern obtained as a result of the search.

The document image generating module 105 masks the first note area N1 included in the first document area D1, and masks the second note area N2 included in the second document area D2. Specifically, the document image generating module 105 masks the mask area M1, which is part of the first note area N1, included in the first document area D1 with the color (background color) of the document area D1. The mask area M1 is an area in which the first note area N1 is layered on the first document area D1. Meanwhile, the document image generating module 105 masks the mask area M2, which is part of the second note area N2, included in the second document area D2 with the color (background color) of the document area D2. The mask area M2 is an area in which the second note area N2 is layered on the second document area D2. Meanwhile, where a captured image does not include a note area, the document image generating module 105 extracts a document image from the captured image (without masking). Further, the document image generating module 105 fails to mask a note area positioned at a position different from a certain position (first position or second position), which is not extracted by the note area extracting module 103. In this way, the document image generating module 105 generates the document images of all the pages based on the captured images of all the pages (Step S105).

The file name generating module 106 generates a file name including the first characters C1 included in the first note area N1 positioned at the first position (Step S106).

The index name generating module 107 generates an index name including the second characters C2 included in the second note area N2 positioned at the second position (Step S107).

The index page generating module 108 generates an index page. The index page is a page including, as a table of contents, the index name (including the second characters C2 included in the second note area N2) generated by the index name generating module 107. The index page generating module 108 generates link information for linking to a second page. The second page is a page of a document image generated based on the captured image I2 from which the second note area N2 is extracted. The index page generating module 108 associates the index name included in the index page with the link information (Step S108).

The file generating module 109 generates the electronic file having the file name (including the first characters C1) generated by the file name generating module 106, and including the index page and the document image generated by the index page generating module 108. The file generating module 109 generates the electronic file including the index page inserted in the first page, second page, or the like of the document image (Step S109).

II. SECOND EMBODIMENT

Hereinafter, configurations, operations, and the like described in the first embodiment will be denoted by the same or similar reference symbols, and the description and drawings will sometimes be omitted. A hardware configuration of an image forming apparatus of a second embodiment is similar to the hardware configuration of the image forming apparatus of the first embodiment.

1. Functional Configuration of Image Forming Apparatus

Figure 6:
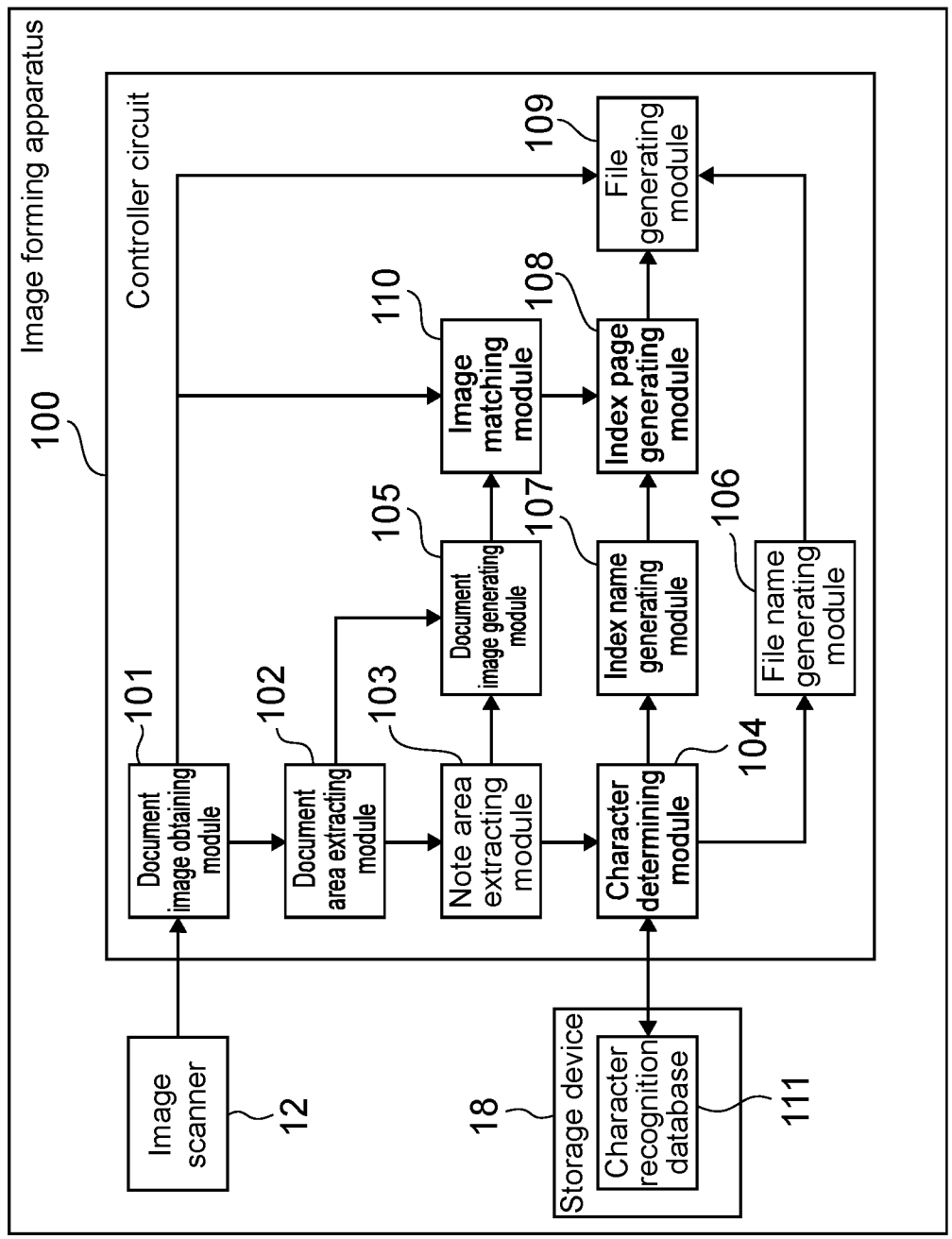
FIG. 6 shows a functional configuration of an image forming apparatus of the second embodiment.

FIG. 6 shows a functional configuration of an image forming apparatus of the second embodiment.

In the controller circuit 100 of the image forming apparatus 10, the CPU 11a loads an information processing program stored in the ROM 11c in the RAM 11b and executes the information processing program to operate as the document image obtaining module 101, the document area extracting module 102, the note area extracting module 103, the character determining module 104, the document image generating module 105, the file name generating module 106, the index name generating module 107, the index page generating module 108, the file generating module 109, and the image matching module 110.

2. Operational Flow of Image Forming Apparatus

Figure 7:
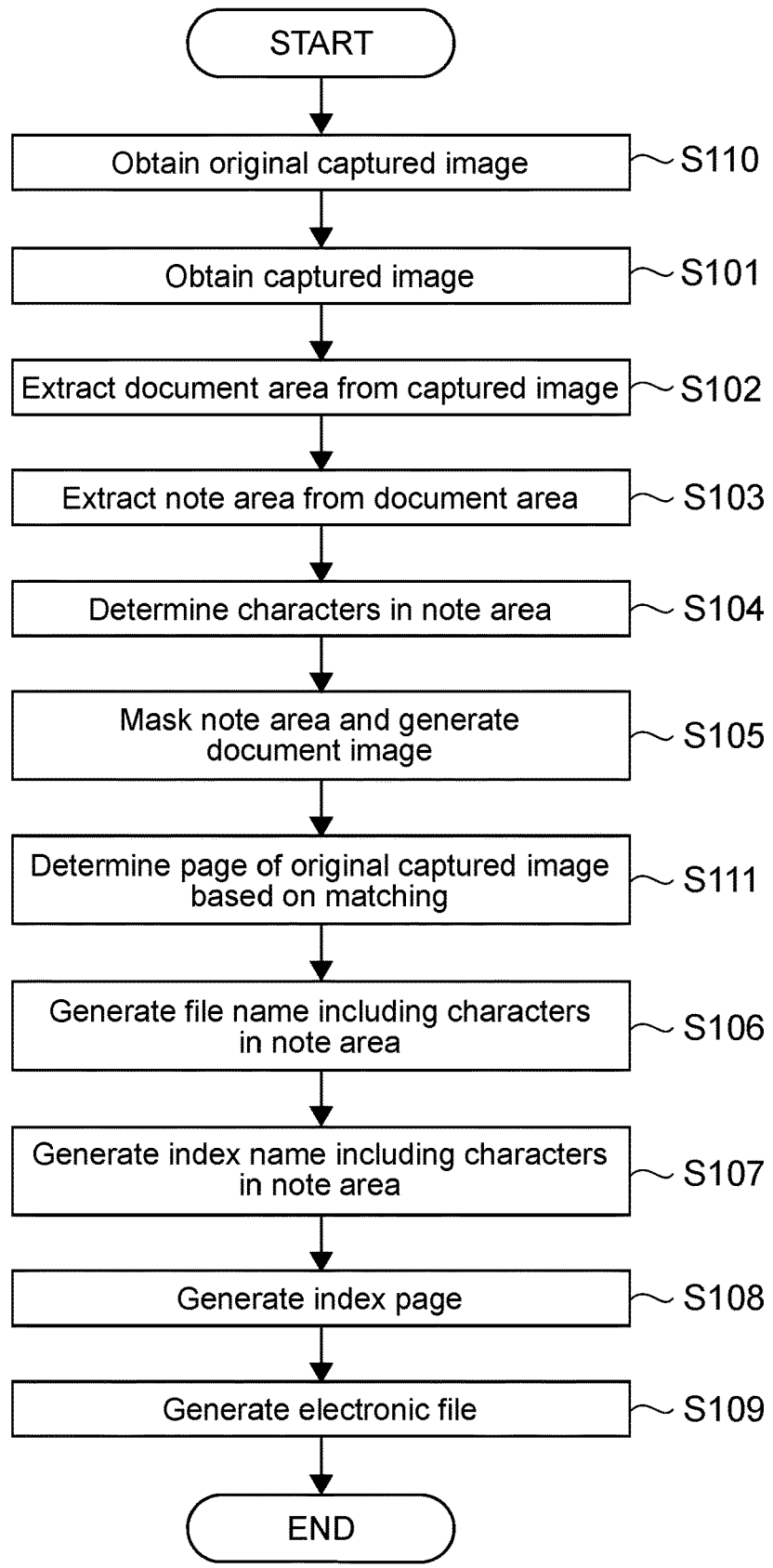
FIG. 7 shows an operational flow of the image forming apparatus.

FIG. 7 shows an operational flow of the image forming apparatus.

The document image obtaining module 101 obtains an original captured image, the original captured image being generated by optically capturing an original document by the image scanner 12 (Step S110). The document has one or more (in this example, multiple) pages. The original document means a document onto which notes (described later), in which characters are written, are not attached at certain positions of the document.

After that, a user puts notes (first note and second note), on which characters (typically, handwritten characters) are written, onto certain positions of at least part of (in this example, multiple) pages of the multiple pages of the document. The note is, typically, a medium (typically, paper) whose size is smaller than the size of the document. The note is entirely or partially attached (temporarily and adhesively) onto the document with pre-applied glue, sticky tape, or the like.

The document image obtaining module 101 obtains a first captured image, the first captured image being generated by optically capturing the first page (one page) of a document by the image scanner 12, a first note being attached onto the first page of the document. The document image obtaining module 101 obtains a second captured image (one or multiple), the second captured image being generated by optically capturing the second page (one or multiple) of a document by the image scanner 12, a second note (one or multiple) being attached onto the second page (one or multiple) of the document (Step S101). The document image obtaining module 101 may capture the first page and the second page separately (via platen one by one) or in a batch (via automatic feeder).

Figure 5:
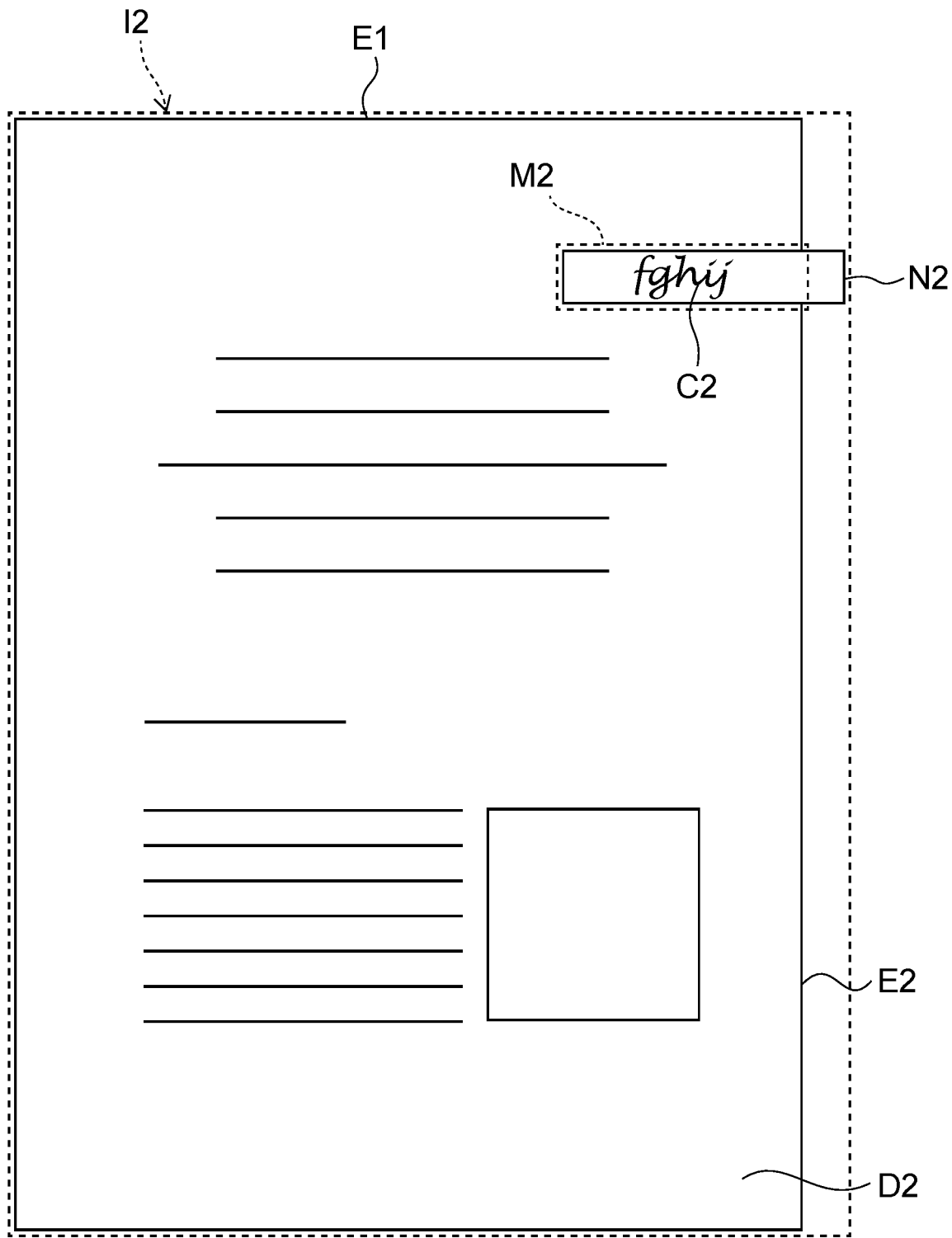
FIG. 5 shows a captured image of another page onto which a note is attached.

With reference to FIG. 4 (a captured image of a page onto which a note is attached) and FIG. 5 (a captured image of another page onto which a note is attached) again, description will be made.

In this example, the document image obtaining module 101 extracts the captured image I1 or I2 of a document onto which a note is attached. The captured image I1 or I2 includes all the edges and points of the document and the edges and points of the note. In other words, the complete document and the complete note are included in the captured image I1 or I2. The captured image I1 or I2 is an image per page.

The document area extracting module 102 extracts the document area D1 or D2 from the captured image I1 or I2 by a known method (by detecting edges and/or points, etc.) (Step S102). The document area D1 or D2 is an area defined by the edges and points of a document per page out of the captured image I1 or I2. In other words, the document area D1 or D2 is a document area per page. The document area D1 or D2 includes an area on which a note is layered.

The note area extracting module 103 extracts the note area N1 or N2 positioned at a certain position (first position or second position) from the captured image I1 or I2 by a known method (by detecting edges and/or points, etc.). The note area extracting module 103 determines the position (specifically, coordinates) of the note area N1 or N2 with respect to the document area D1 or D2 (Step S103). The note area N1 or N2 is an area defined by the edges and points of a note out of the captured image I1 or I2. The note area extracting module 103 determines a rectangle having a certain size (standard size of typical note) as the note area N1 or N2. Alternatively, the note area extracting module 103 may determine a rectangle having a certain size (size of typical note commercially available) and a certain color (color of typical note commercially available) as the note area N1 or N2. The note area N1 or N2 includes the area layered on the document and the area out of the document. Note that the note area extracting module 103 fails to extract a note area not positioned at the certain position (first position or second position).

Specifically, the note area extracting module 103 extracts the first note area N1 positioned at a first position of the document area D1 from the first captured image I1 of the first page, i.e., a certain page (typically, page No. 1). The distance between the first position and the first edge E1 (in this example, top edge) of the document area D1 is smaller than a first threshold. The situation in which "the distance between the first position and the first edge E1 of the document area D1 is smaller than a first threshold (first position)" means that the first note area N1 is positioned near the first edge E1 (or, as shown in the figure, is layered on the first edge E1).

Meanwhile, the note area extracting module 103 extracts the second note area N2 positioned at a second position of the document area D2 from the second captured image I2 of the second page, i.e., an arbitrary (page No. 1 or another page). The distance between the second position and the second edge E2 (in this example, right edge) of the document area D2 is smaller than a second threshold (may be same as or different from first threshold). The first edge E1 (in this example, top edge) is different from the second edge E2 (in this example, right edge). The situation in which "the distance between the second position and the second edge E2 of the document area D2 is smaller than a second threshold (second position)" means that the second note area N2 is positioned near the second edge E2 (or, as shown in the figure, is layered on the second edge E2).

The character determining module 104 determines the first characters C1 included in the first note area N1 and the second characters C2 included in the second note area N2 by OCR (Optical Character Recognition) (Step S104). Specifically, the character determining module 104 extracts the image (referred to as character image) of the first characters C1 included in the first note area N1 and the image (referred to as character image) of the second characters C2 included in the second note area N2. With reference to the character recognition database 111, the character determining module 104 determines the characters specified by the extracted character image. Specifically, the character recognition database 111 registers a character image pattern and a character code in association with each other for each character. The character determining module 104 searches the character recognition database 111 for the image pattern of the extracted character image, and determines the character code in association with the image pattern obtained as a result of the search.

The document image generating module 105 masks the first note area N1 included in the first document area D1, and masks the second note area N2 included in the second document area D2. Specifically, the document image generating module 105 masks the mask area M1, which is part of the first note area N1, included in the first document area D1 with the color (background color) of the document area D1. The mask area M1 is an area in which the first note area N1 is layered on the first document area D1. Meanwhile, the document image generating module 105 masks the mask area M2, which is part of the second note area N2, included in the second document area D2 with the color (background color) of the document area D2. The mask area M2 is an area in which the second note area N2 is layered on the second document area D2. Meanwhile, where a captured image does not include a note area, the document image generating module 105 extracts a document image from the captured image (without masking). Further, the document image generating module 105 fails to mask a note area positioned at a position different from a certain position (first position or second position), which is not extracted by the note area extracting module 103. In this way, the document image generating module 105 generates the document image of the first page based on the first captured image, and generates the document image of the second page based on the second captured image (Step S105).

The image matching module 110 determines whether or not the document image of the first page matches with the original captured image, and thereby determines the first page of the original captured image. In other words, the image matching module 110 determines which page of the multiple pages of the original captured image is the first page. The image matching module 110 determines whether or not the document image of the second page matches with the original captured image, and thereby determines the second page of the original captured image. In other words, the image matching module 110 determines which page of the multiple pages of the original captured image is the second page (Step S111).

The file name generating module 106 generates a file name including the first characters C1 included in the first note area N1 positioned at the first position (Step S106).

The index name generating module 107 generates an index name including the second characters C2 included in the second note area N2 positioned at the second position (Step S107).

The index page generating module 108 generates an index page. The index page is a page including, as a table of contents, the index name (including the second characters C2 included in the second note area N2) generated by the index name generating module 107. The index page generating module 108 generates link information for linking to a second page. The second page is a page (page onto which second note is attached) of the original captured image. The index page generating module 108 associates the index name included in the index page with the link information (Step S108).

The file generating module 109 generates the electronic file having the file name (including the first characters C1) generated by the file name generating module 106, and including the index page and the original captured image generated by the index page generating module 108. The file generating module 109 generates the electronic file including the index page inserted in the page No. 1, the page No. 2, or the like of the original captured image (Step S109).

3. Examples of GUIs

Figure 8:
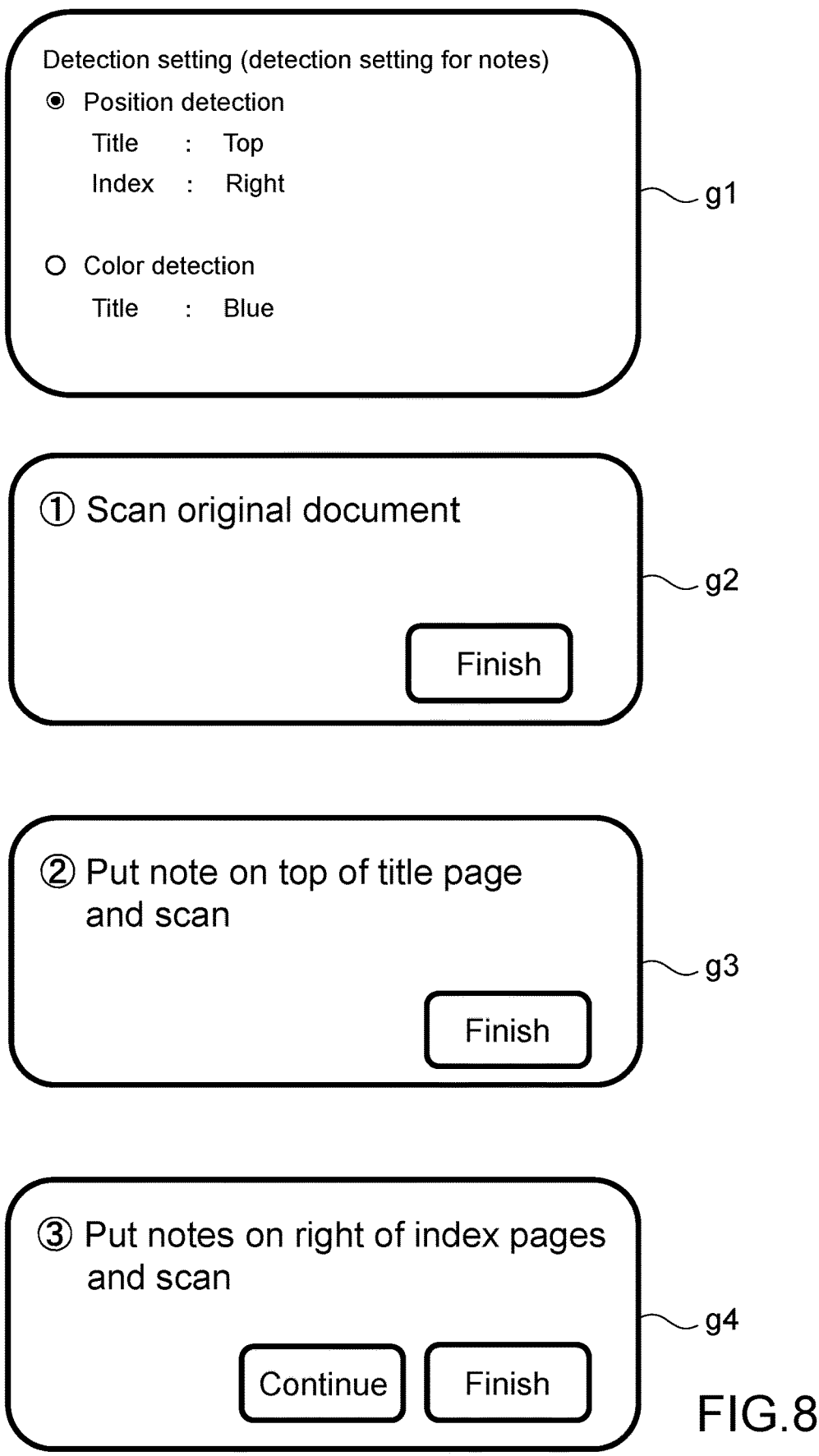
FIG. 8 shows examples of GUIs.

FIG. 8 shows examples of GUIs.

The image forming apparatus 10 may display GUIs for user guidance during execution of the aforementioned operational flow. Specific examples will be described below.

Before the document area extracting module 102 extracts the document area D1 or D2 from the captured image I1 or I2 (Step S102), the GUI g1 may be displayed on the display device 17a to inform a user of the positions onto which notes are to be attached and the color of a note. As a result, for example, the note area extracting module 103 may determine a rectangle positioned at a certain position and having a certain color as the note area N1 or N2 (Step S103).

Before the image scanner 12 optically captures an original document to generate an original captured image and the document image obtaining module 101 obtains the original captured image (Step S110), the GUI g2 may be displayed on the display device 17a to guide a user to put an original document, onto which no notes are attached, on the image scanner 12 for image capturing.

Before the image scanner 12 optically captures the first page, which has the first note attached onto a certain position thereof, to generate the first captured image and the document image obtaining module 101 obtains the first captured image (Step S101), the GUI g3 may be displayed on the display device 17a to inform a user of the page and the position onto which the first note is to be attached.

Before the image scanner 12 optically captures the second page, which has the second note attached onto a certain position thereof, to generate the second captured image and the document image obtaining module 101 obtains the second captured image (Step S101), the GUI g4 may be displayed on the display device 17a to inform a user of the page and the position onto which the second note is to be attached.

III. CONCLUSION (1) According to the first embodiment, the note area extracting module 103 extracts the first note area N1 positioned at the first position of the document area D1 of the first page from the captured image I1 (Step S103). The file name generating module 106 generates the file name including the first characters C1 included in the first note area N1 (Step S106). As a result, a user only has to write characters being a file name on a note, attach the note onto the certain position of a document, and put the document onto which the note is attached on the image scanner 12 for image capturing. Then the file generating module 109 generates an electronic file of the document image having the desired file name (Step S109). Especially, the user only has to concern about the position of the document, onto which the note is attached, without concerning about the types of the notes (color, shape, etc.), for example. It is not a burden for the user and is user-friendly. Further, the document image generating module 105 masks the first note area N1 included in the document area D1, and generates the document image (Step S105). As a result, it is possible to generate an electronic file of a document image having a desired quality without the first note area N1, which is unnecessary as the finalized file.

Further, according to the first and second embodiments, the attached note may be removed from a document afterward. So the document remains intact different from a case where, for example, characters are handwritten on a document and then erased. Further, the embodiments are applicable to a document (confidential document, etc.) in which characters should not be handwritten. Further, the character determining module 104 optically recognizes characters only in the note area N1. So it is possible to optically recognize characters faster than a case where, for example, characters on the entire document are optically recognized since the processing volume is smaller. Further, the note area extracting module 103 only extracts a rectangle positioned at a certain position (first position or second position) and having a certain size (standard size of typical note) as the note area N1 or N2. So it is not necessary to preregister note areas to be extracted in detail, for example.

(2) According to the first embodiment, the index name generating module 107 generates an index name including the second characters C2 included in the second note area N2 positioned at the second position different from the first position (Step S107). The file generating module 109 generates an electronic file including an index page and a document image (Step S109). As a result, a user only has to write characters being an index name on a note, attach the note onto the certain position of a document, and put the document onto which the note is attached on the image scanner 12 for image capturing. Then the file generating module 109 generates an electronic file including an index page including a desired index name, with which link information (to second page onto which note is attached) is associated (Step S109). Especially, the user only has to concern about the position of the document, onto which the note is attached, without concerning about the types of the notes (color, shape, etc.), for example. It is not a burden for the user and is user-friendly. Further, the first position is different from the second position. So it is possible to prevent an error in which characters written on a note as a file name are determined as an index name and, to the contrary, an error in which characters written on a note as an index name are determined as a file name.

(3) According to the first embodiment, the note area extracting module 103 extracts the first note area N1 positioned at the first position, the distance between the first position and the first edge E1 (for example, top edge) of the document area D1 being smaller than the first threshold (Step S103). As a result, a user only has to write characters being a file name on a note, attach the note onto the certain position (i.e., position onto which note, in which file name is written, is typically attached, e.g., position near top edge) of a document, and put the document onto which the note is attached on the image scanner 12 for image capturing. Then the file generating module 109 generates an electronic file of the document image having the desired file name (Step S109). Especially, the user does not have to concern about the types of the notes (color, shape, etc.), for example. The user only has to attach a note onto a position onto which a note, in which a file name is written, is typically attached, e.g., a position near the top edge. It is self-explanatory, convenient, and user-friendly.

(4) According to the first embodiment, the note area extracting module 103 extracts the first note area N1 from a certain page (typically, page No. 1) of the captured image I1 (Step S103). As a result, a user only has to write characters being a file name on a note, attach the note onto the certain page (i.e., page onto which note, in which file name is written, is typically attached, e.g., page No. 1) of a document, and put the document onto which the note is attached on the image scanner 12 for image capturing. Then the file generating module 109 generates an electronic file of the document image having the desired file name (Step S109). Especially, the user does not have to concern about the types of the notes (color, shape, etc.), for example. The user only has to attach a note onto a page onto which a note, in which a file name is written, is typically attached, e.g., the page No. 1. It is self-explanatory, convenient, and user-friendly.

(5) According to the first embodiment, the note area extracting module 103 extracts the second note area N2 positioned at the second position, the distance between the second position and the second edge E2 being smaller than the second threshold, the second edge E2 being different from the first edge E1 of the document area (Step S103). As a result, a user only has to write characters being an index name on a note, attach the note onto the certain position (i.e., position onto which note, in which index name is written, is typically attached, e.g., position near right edge) of a document, and put the document onto which the note is attached on the image scanner 12 for image capturing. Then the file generating module 109 generates an electronic file including an index page including a desired index name, with which link information (to second page onto which note is attached) is associated (Step S109). Especially, the user does not have to concern about the types of the notes (color, shape, etc.), for example. The user only has to attach a note onto a position onto which a note, in which an index name is written, is typically attached, e.g., a position near the right edge. It is self-explanatory, convenient, and user-friendly.

(6) According to the first and second embodiments, the note area extracting module 103 fails to extract a note area not positioned at the first position and the second position (Step S103). As a result, the document image generating module 105 fails to mask the note area not positioned at the certain position (first position or second position) which is not extracted by the note area extracting module 103 (Step S105). As a result, it is possible to prevent an error in which a note that a user uses as usual is masked. Further, a user does not have to remove a note that the user uses as usual before image capturing (scanning). It is convenient and user-friendly.

(7) According to the first and second embodiments, the image processing apparatus is realized by an image forming apparatus including an image scanner, and is realized by an information processing apparatus including no image scanner. In the latter case, the information processing apparatus may obtain a captured image from an image forming apparatus including an image scanner via, typically, a network, near field communication, or USB connection.

(9) According to the second embodiment, the note area extracting module 103 extracts the first note area N1 positioned at the first position of the document area D1 of the first page from the first captured image I1 (Step S103). The file name generating module 106 generates the file name including the first characters C1 included in the first note area N1 (Step S106). As a result, a user only has to write characters being a file name on a note, attach the note onto the certain position of a document, and put the page onto which the note is attached on the image scanner 12 for image capturing. Then the file generating module 109 generates an electronic file of the original captured image having the desired file name (Step S109). Especially, the user only has to concern about the position of the document, onto which the note is attached, without concerning about the types of the notes (color, shape, etc.), for example. It is not a burden for the user and is user-friendly. Further, the user only has to put an original document, onto which no note is attached, on the image scanner 12 for image capturing. As a result, it is possible to generate an electronic file of an original captured image having a desired quality without the first note area N1, which is unnecessary as the finalized file.

(10) According to the second embodiment, the image matching module 110 determines whether or not the document image of the second page matches with the original captured image, and determines the second page of the original captured image (Step S111). The image matching module 110 determine whether or not the masked document image matches with the original captured image. As a result, the image matching module 110 reliably determines that which page of the multiple pages of the original captured image is the second page. Further, the index name generating module 107 generates an index name including the second characters C2 included in the second note area N2 positioned at the second position different from the first position (Step S107). The file generating module 109 generates an electronic file including an index page and the original captured image (Step S109). As a result, a user only has to write characters being an index name on a note, attach the note onto the certain position of a document, and put the page onto which the note is attached on the image scanner 12 for image capturing. Then the file generating module 109 generates an electronic file including an index page including a desired index name, with which link information (to second page onto which note is attached) is associated (Step S109). Especially, the user only has to concern about the position of the document, onto which the note is attached, without concerning about the types of the notes (color, shape, etc.), for example. It is not a burden for the user and is user-friendly. Further, the first position is different from the second position. So it is possible to prevent an error in which characters written on a note as a file name are determined as an index name and, to the contrary, an error in which characters written on a note as an index name are determined as a file name.

(11) According to the second embodiment, the note area extracting module 103 extracts the first note area N1 positioned at the first position, the distance between the first position and the first edge E1 (for example, top edge) of the document area D1 being smaller than the first threshold (Step S103). As a result, a user only has to write characters being a file name on a note, attach the note onto the certain position (i.e., position onto which note, in which file name is written, is typically attached, e.g., position near top edge) of a document, and put the page onto which the note is attached on the image scanner 12 for image capturing. Then the file generating module 109 generates an electronic file of the original document image having the desired file name (Step S109). Especially, the user does not have to concern about the types of the notes (color, shape, etc.), for example. The user only has to attach a note onto a position onto which a note, in which a file name is written, is typically attached, e.g., a position near the top edge. It is self-explanatory, convenient, and user-friendly.

(12) According to the second embodiment, the note area extracting module 103 extracts the first note area N1 from a certain page (typically, page No. 1) of the captured image I1 (Step S103). As a result, a user only has to write characters being a file name on a note, attach the note onto the certain page (i.e., page onto which note, in which file name is written, is typically attached, e.g., page No. 1) of a document, and put the page onto which the note is attached on the image scanner 12 for image capturing. Then the file generating module 109 generates an electronic file of the original document image having the desired file name (Step S109). Especially, the user does not have to concern about the types of the notes (color, shape, etc.), for example. The user only has to attach a note onto a page onto which a note, in which a file name is written, is typically attached, e.g., the page No. 1. It is self-explanatory, convenient, and user-friendly.

(13) According to the second embodiment, the note area extracting module 103 extracts the second note area N2 positioned at the second position, the distance between the second position and the second edge E2 being smaller than the second threshold, the second edge E2 being different from the first edge E1 of the document area (Step S103). As a result, a user only has to write characters being an index name on a note, attach the note onto the certain position (i.e., position onto which note, in which index name is written, is typically attached, e.g., position near right edge) of a document, and put the page onto which the note is attached on the image scanner 12 for image capturing. Then the file generating module 109 generates an electronic file including an index page including a desired index name, with which link information (to second page onto which note is attached) is associated (Step S109). Especially, the user does not have to concern about the types of the notes (color, shape, etc.), for example. The user only has to attach a note onto a position onto which a note, in which an index name is written, is typically attached, e.g., a position near the right edge. It is self-explanatory, convenient, and user-friendly.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
 a controller circuit configured to operate as
  a captured image obtaining module configured to obtain a captured image, the captured image being generated by optically capturing a document having one or more pages by an image scanner, a first note on which a first character is written being attached onto a first page of the document,
  a document area extracting module configured to extract a document area from the captured image, the document area being an area of the document,
  a note area extracting module configured to extract a first note area from the captured image, the first note area being an area of the first note positioned at a first position of the document area of the first page,
  a character determining module configured to determine the first character included in the first note area by optical character recognition,
  a document image generating module configured to mask the first note area included in the document area, and generate a document image,
  a file name generating module configured to generate a file name including the first character, and
  a file generating module configured to generate an electronic file of the document image having the file name, wherein
 the captured image obtaining module is configured to obtain the captured image, the captured image being generated by optically capturing the document having the one or more pages by the image scanner, a second note on which a second character is written being attached onto a second page of the document,
 the note area extracting module is configured to extract a second note area from the captured image, the second note area being an area of the second note positioned at a second position of the document area of the second page, the second position being different from the first position,
 the character determining module is configured to determine the second character included in the second note area by optical character recognition,
 the document image generating module is configured to further mask the second note area included in the document area, and generate the document image,
 the controller circuit is further configured to operate as
  an index name generating module configured to generate an index name including the second character, and
  an index page generating module configured to
   generate an index page, the index page being a page including the index name
   generate link information for linking to the second page, and associate the index name included in the index page with the link information, and the file generating module is configured to generate the electronic file including the index page and the document image.

2. The image processing apparatus according to claim 1, wherein the document area extracting module is configured to detect an edge and/or a point, and thereby extract the document area having a rectangular shape, and the note area extracting module is configured to extract the first note area positioned at the first position, a distance between the first position and a first edge of the document area being smaller than a first threshold.

3. The image processing apparatus according to claim 1, wherein the document area extracting module is configured to detect an edge and/or a point, and thereby extract the document area having a rectangular shape, and the note area extracting module is configured to extract the first note area from a certain page of the captured image.

4. The image processing apparatus according to claim 1, wherein the document area extracting module is configured to detect an edge and/or a point, and thereby extract the document area having a rectangular shape, and the note area extracting module is configured to extract the second note area positioned at the second position, a distance between the second position and a second edge of the document area being smaller than a second threshold, the second edge being different from a first edge.

5. The image processing apparatus according to claim 1, wherein the note area extracting module is configured to fail to extract a note area not positioned at the first position and the second position.

6. The image processing apparatus according to claim 1, further comprising:

the image scanner.

7. A non-transitory computer readable recording medium that records an image processing program that causes a controller circuit of an image processing apparatus to operate as a captured image obtaining module configured to obtain a captured image, the captured image being generated by optically capturing a document having one or more pages by an image scanner, a first note on which a first character is written being attached onto a first page of the document, a document area extracting module configured to extract a document area from the captured image, the document area being an area of the document, a note area extracting module configured to extract a first note area from the captured image, the first note area being an area of the first note positioned at a first position of the document area of the first page, a character determining module configured to determine the first character included in the first note area by optical character recognition, a document image generating module configured to mask the first note area included in the document area, and generate a document image, a file name generating module configured to generate a file name including the first character, and a file generating module configured to generate an electronic file of the document image having the file name, wherein the captured image obtaining module is configured to obtain the captured image, the captured image being generated by optically capturing the document having the one or more pages by the image scanner, a second note on which a second character is written being attached onto a second page of the document, the note area extracting module is configured to extract a second note area from the captured image, the second note area being an area of the second note positioned at a second position of the document area of the second page, the second position being different from the first position, the character determining module is configured to determine the second character included in the second note area by optical character recognition, the document image generating module is configured to further mask the second note area included in the document area, and generate the document image, the controller circuit is further configured to operate as an index name generating module configured to generate an index name including the second character, and an index page generating module configured to
generate an index page, the index page being a page including the index name
generate link information for linking to the second page, and
associate the index name included in the index page with the link information, and the file generating module is configured to generate the electronic file including the index page and the document image.

* * * * *